United States Patent
Chandrashekhara et al.

(10) Patent No.: US 12,248,692 B1
(45) Date of Patent: Mar. 11, 2025

(54) SELECTIVE PACKING OF SMALL BLOCK WRITE OPERATIONS PRIOR TO COMPRESSION

(71) Applicant: Dell Products, L.P., Hopkinton, MA (US)

(72) Inventors: Sandeep Chandrashekhara, Shrewsbury, MA (US); Mohammed Asher, Bangalore (IN); Ramesh Doddaiah, Westborough, MA (US); Aamir Mohammed Vt, Bangalore (IN)

(73) Assignee: Dell Products, L.P., Hopkinton, MA (US)

( * ) Notice: Subject to any disclaimer, the term of this patent is extended or adjusted under 35 U.S.C. 154(b) by 0 days.

(21) Appl. No.: 18/387,235

(22) Filed: Nov. 6, 2023

(51) Int. Cl.
*G06F 3/06* (2006.01)
*G06F 12/02* (2006.01)

(52) U.S. Cl.
CPC .............. *G06F 3/064* (2013.01); *G06F 3/061* (2013.01); *G06F 3/0626* (2013.01); *G06F 3/0673* (2013.01)

(58) Field of Classification Search
CPC .............. G06F 12/023; G06F 12/0284; G06F 12/0292; G06F 12/1027; G06F 12/1036; G06F 2209/5011; G06F 2212/1041; G06F 2212/1044; G06F 2212/152; G06F 2212/154; G06F 2212/163; G06F 2212/2542; G06F 2212/657; G06F 9/5016; G06F 11/1461; G06F 2201/84; G06F 3/0619; G06F 3/0644; G06F 3/065; G06F 3/0656; G06F 3/0688; G06F 3/0689

See application file for complete search history.

(56) References Cited

U.S. PATENT DOCUMENTS 10,114,576 B2 * 10/2018 Peterson ............... G06F 3/0679
10,747,635 B1 * 8/2020 Trachtman .......... G06F 11/0793

* cited by examiner

Primary Examiner — Yong J Choe
(74) Attorney, Agent, or Firm — Anderson Gorecki LLP (57) ABSTRACT

Selective packing of small block write operations is implemented prior to compression, to improve compression efficiency and hence reduce bandwidth requirements of a Remote Data Replication (RDR) facility. Compression characteristics of write IO operations are forecast, and write IO operations with similar forecast compression characteristics are pooled. Write IO operations are also grouped according to extent, device, and storage group. Write operations from a given compression pool are then preferentially selected from the extent-level grouping, next from the device-level grouping, and then from the SG-level grouping, to create an IO package. The IO package is then compressed and transmitted on the RDR facility. By creating an IO package prior to compression, it is possible to achieve greater compression than would be possible if each individual write IO operation were to be individually compressed to thereby reduce network bandwidth of the RDR facility.

20 Claims, 8 Drawing Sheets

SELECTIVE PACKING OF SMALL BLOCK WRITE OPERATIONS PRIOR TO COMPRESSION

FIELD

This disclosure relates to computing systems and related devices and methods, and, more particularly, to a method and apparatus for selective packing of small block write operations prior to compression to improve compression efficiency, and to reduce bandwidth consumption on a remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

In some embodiments, a method and apparatus for selective packing of small block write operations prior to compression to improve compression efficiency is provided. In some embodiments, compression characteristics of write IO operations are forecast, and write IO operations with similar forecast compression characteristics are pooled according to the forecast compression characteristics. Write IO operations are also grouped according to extent, device, and storage group. Write operations from a given compression pool are then preferentially selected from the extent grouping, next from the device grouping, and then from the storage group grouping, to create an IO package. The IO package is then compressed, and transmitted on a remote data replication facility. By creating an IO package prior to compression, it is possible to achieve greater compression than would be possible if each individual write IO operation were to be individually compressed. This reduces the network bandwidth required to implement the remote data replication facility.

In some embodiments, a method of selective packing of small block write operations prior to compression, includes creating a plurality of Storage Groups (SG), each SG including at least one logical storage device, the logical storage device including a plurality of extents, and each extent including a plurality of tracks. The method further includes receiving write operations, each write operation being directed at a respective track on a respective extent in a respective device in a respective SG, forecasting compressibility characteristics of each received write operation, and pooling write operations with similar forecast compressibility characteristics into a set of two or more compressibility pools. The method further includes forming a set of extent-level groups, each extent-level group including write operations on tracks included in the respective extent, forming a set of device-level groups, each device-level group including write operations on tracks included in extents included in the respective device, forming a set of SG-level groups, each SG-level group including write operations on tracks included in extents included in devices included in the respective SG. The method further includes creating IO packages from each of the compressibility pools, each IO package containing a respective selected set of write IO operations contained in at most one of the compressibility pools, the respective selected set of write IO operations being selected first from the extent-level group, then from the device-level group, and then from the SG-level group.

In some embodiments, the method further includes compressing each IO package to create a respective compressed IO package, and transmitting each IO package on a remote data replication facility from a primary storage system to a backup storage system. In some embodiments, the method further includes removing respective selected sets of write IO operations from the compressibility pools, extent-level groups, device-level groups, and from the SG-level groups after the respective selected sets of write IO operations have been added to the respective IO packages.

In some embodiments, forecasting compressibility characteristics of each received write operation comprises determining a track of the received write operation, accessing compressibility metadata for adjoining tracks, and using the compressibility metadata for the adjoining tracks to generate the forecast compressibility of the received write operation. In some embodiments, the compressibility metadata for adjoining tracks contains compressibility values of the adjoining tracks achieved by previous compression operations on data contained in the adjoining tracks. In some embodiments, using the compressibility metadata for the adjoining tracks to generate the forecast compressibility of the received write operation comprises averaging the compressibility values of the adjoining tracks. In some embodiments, each of the two or more compressibility pools has a respective data reduction ratio threshold, forecasting compressibility characteristics of each received write operation comprises determining a forecast data reduction ratio for the write operation that is expected to be achieved when data of the write operation is compressed, and each write IO operation is assigned to at most one of the compressibility pools, each write IO operation being assigned to a compressibility pool with a highest respective data reduction ratio threshold that lower than the respective forecast data reduction ratio of the write IO operation.

In some embodiments, the write operations are directed to tracks of data included in a remote data replication group associated with a remote data replication facility.

In some embodiments, each IO package containing a respective selected set of two or more independent and unrelated write IO operations. In some embodiments, each IO package has an uncompressed maximum size based on a size of a slot of memory on the storage system.

In some embodiments, a system for selective packing of small block write operations prior to compression, includes one or more processors and one or more storage devices storing instructions that are operable, when executed by the one or more processors, to cause the one or more processors to perform operations including creating a plurality of Storage Groups (SG), each SG including at least one logical storage device, the logical storage device including a plurality of extents, and each extent including a plurality of tracks. The operations further include receiving write operations, each write operation being directed at a respective track on a respective extent in a respective device in a respective SG, forecasting compressibility characteristics of each received write operation, and pooling write operations with similar forecast compressibility characteristics into a set of two or more compressibility pools. The operations further include forming a set of extent-level groups, each extent-level group including write operations on tracks included in the respective extent, forming a set of device-level groups, each device-level group including write operations on tracks included in extents included in the respective device, and forming a set of SG-level groups, each SG-level group including write operations on tracks included in extents included in devices included in the respective SG. The operations further include creating IO packages from each of the compressibility pools, each IO package containing a respective selected set of write IO operations contained in at most one of the compressibility pools, the respective selected set of write IO operations being selected first from the extent-level group, then from the device-level group, and then from the SG-level group.

In some embodiments, the operations further include compressing each IO package to create a respective compressed IO package, and transmitting each IO package on a remote data replication facility from a primary storage system to a backup storage system. In some embodiments, the operations further include removing respective selected sets of write IO operations from the compressibility pools, extent-level groups, device-level groups, and from the SG-level groups after the respective selected sets of write IO operations have been added to the respective IO packages.

In some embodiments, forecasting compressibility characteristics of each received write operation comprises determining a track of the received write operation, accessing compressibility metadata for adjoining tracks, and using the compressibility metadata for the adjoining tracks to generate the forecast compressibility of the received write operation. In some embodiments, the compressibility metadata for adjoining tracks contains compressibility values of the adjoining tracks achieved by previous compression operations on data contained in the adjoining tracks. In some embodiments, using the compressibility metadata for the adjoining tracks to generate the forecast compressibility of the received write operation comprises averaging the compressibility values of the adjoining tracks. In some embodiments, each of the two or more compressibility pools has a respective data reduction ratio threshold, forecasting compressibility characteristics of each received write operation comprises determining a forecast data reduction ratio for the write operation that is expected to be achieved when data of the write operation is compressed, and each write IO operation is assigned to at most one of the compressibility pools, each write IO operation being assigned to a compressibility pool with a highest respective data reduction ratio threshold that lower than the respective forecast data reduction ratio of the write IO operation.

In some embodiments, the write operations are directed to tracks of data included in a remote data replication group associated with a remote data replication facility.

In some embodiments, each IO package containing a respective selected set of two or more independent and unrelated write IO operations. In some embodiments, each IO package has an uncompressed maximum size based on a size of a slot of memory on the storage system.

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
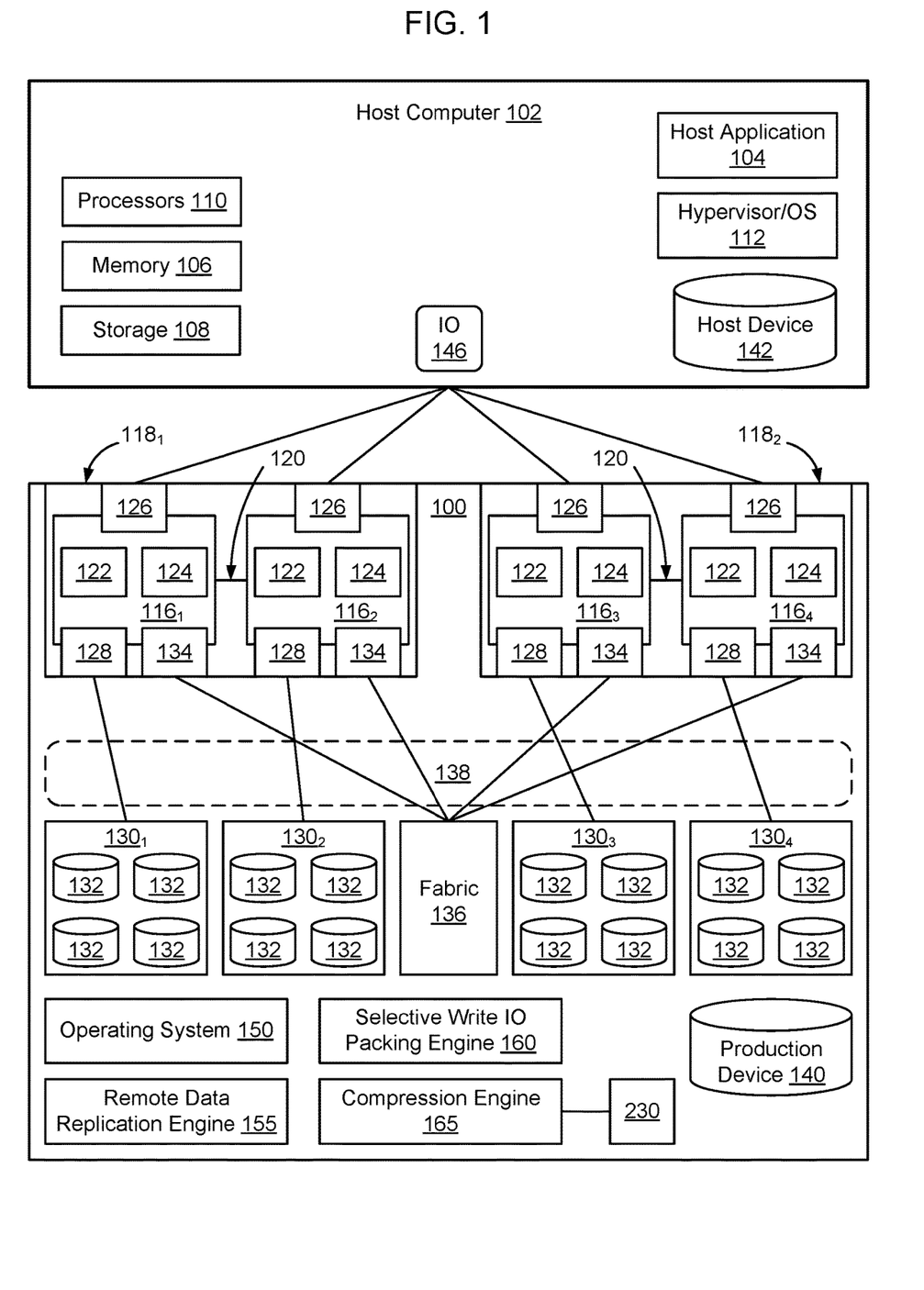
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines $118_1$ and $118_2$, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines $118_1$ and $118_2$, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible, then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

In some embodiments, the storage system 100 includes a remote data replication engine 155 configured to enable the storage system 100 to participate in one or more remote data replication facilities to enable data stored in storage resources 130 to be replicated to a backup storage system 100.

Figure 2:
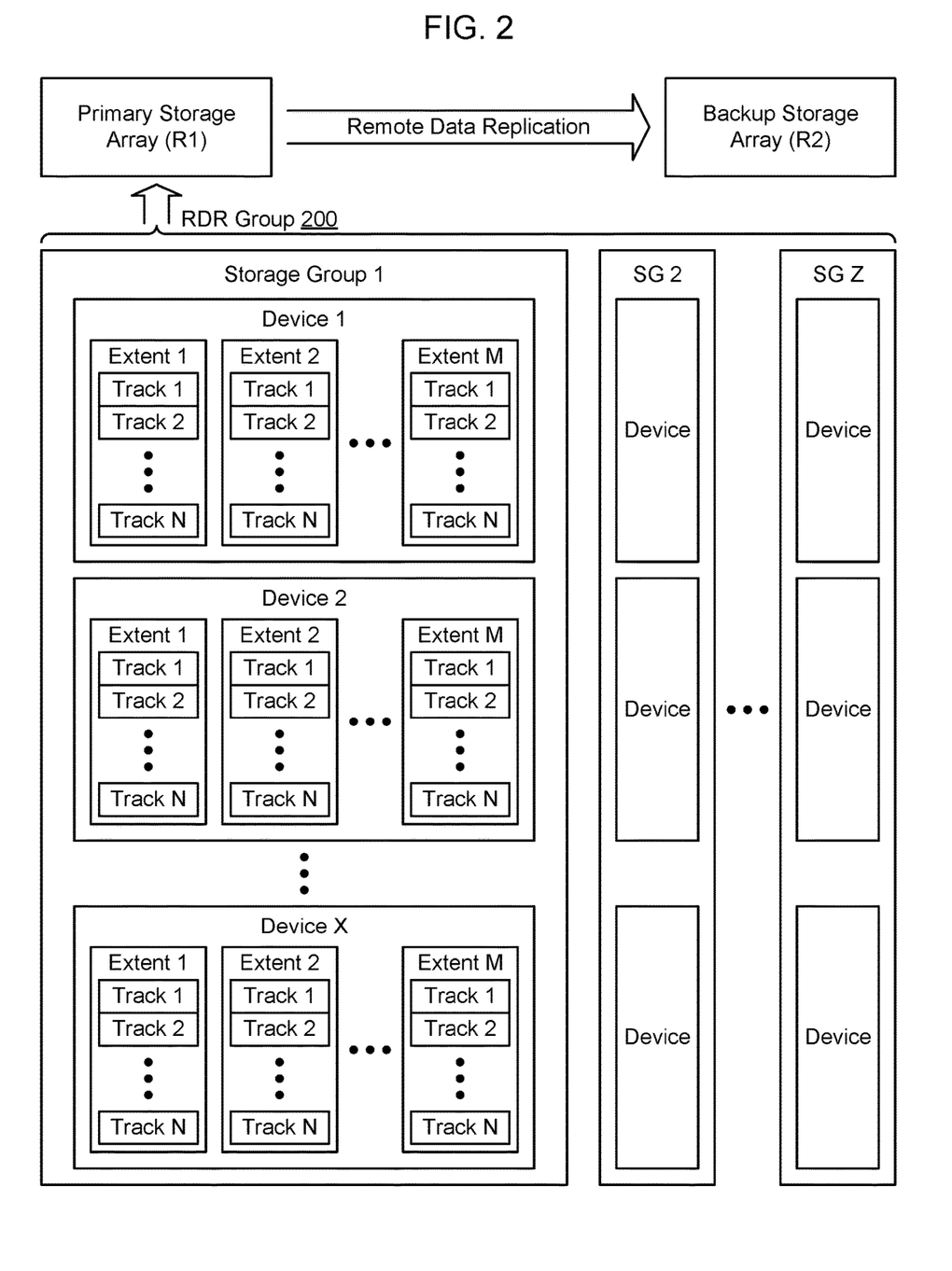
FIG. 2 is a block diagram of a Remote Data Replication (RDR) facility between a primary storage array R1 and a backup storage array R2, on which data of an Remote Data Replication (RDR) group is replicated from the R1 to the R2 storage array, according to some embodiments.

FIG. 2 is a block diagram of a remote data replication facility between a primary storage array R1 and a backup storage array R2, on which data of a Remote Data Replication (RDR) group 200 is replicated from the R1 to the R2 storage array, according to some embodiments. As shown in FIG. 2, it is possible for a primary storage array R1 to perform data replication to a backup storage array R2 where the storage systems 100 are compatible and properly configured. The RDR application 155, when executed on storage system 100, enables the storage array 100 to participate in storage system level data replication between sets of mirroring pairs of storage systems 100. A set of storage arrays 100 that are configured for data to be mirrored from a primary storage array R1 to a backup storage array R2 will be referred to herein as a "Remote Data Replication Facility". A given storage system, such as storage system 100, may operate as a primary storage array R1 or backup storage array R2 in many mirroring pairs, and hence multiple RDR applications 155 may simultaneously execute on storage system 100 to control participation of the storage system 100 in the mirroring operations of multiple remote data replication facilities.

In some embodiments, the Remote Data Replication engine 155 is configured to cause subsets of data stored within storage resources 132 of storage array 130 to be mirrored in real time (as I/Os occur) by the storage system 100 to one or more similar backup storage system 100. One example Remote Data Replication technology is used by Dell™ and referred to as Symmetrix Remote Data Facility, also referred to as SRDF or RDF. However, the embodiments described herein are not limited to implementations that uses SRDF as the remote data replication technology, as other synchronous or asynchronous remote data replication technologies and remote replication techniques may be used as well.

As shown in FIG. 2, in some embodiments a RDR group 200 is formed from one or more storage groups 205. Each storage group 205 includes one or more logical devices. An example logical device, for example, might be production device 140. Each logical device includes a plurality of extents. Extents, in some embodiments, are fixed size allocations of storage. An example extent size might be, for example, 128 Kb although the particular size of the extent will depend on the particular implementation. Data of the extents is stored on tracks of storage provided by the managed storage resources 132, such that each extent has a large number of tracks. Write IO operations by the host 102 typically occur on particular tracks or on portions of tracks. For example, a given write IO operation might occur on a portion of a track, on an entire track, on a set of tracks of a given extent, or on a set of tracks that are contained in multiple extents of a given device.

When a write operation is received on the primary storage array R1, the write operation is mirrored using the remote data replication engine 166 to the backup storage array R2. Data transfer among storage systems 100, including transfers between storage arrays for data replication (mirroring) functions, may take place in several ways depending on how the primary storage system R1 handles data written by the host 102 and how the backup storage system R2 acknowledges receipt of data on the remote data replication facility. Two example data mirroring modes will be referred to herein as synchronous (SYNC) and asynchronous (ASYNC). Where data transfers occur between storage arrays 100, data transfer can take place over a communication network connecting the storage arrays 100, such as a Fibre Channel network or an Internet Protocol (IP) network.

In synchronous RDR data replication mode, to maintain a synchronous relationship between the primary storage array R1 and the backup storage array R2, each IO from each host 102 is forwarded by the primary storage array R1 to the backup storage array R2 as it is received from host 102, and the primary storage array R1 will wait for an acknowledgment from the backup storage array R2 before the primary storage array R1 acknowledges the write IO to the host 102.

In an asynchronous RDR data replication mode, when data is received from a host 102, the data is written to the primary storage array R1 and a data transfer process is initiated to write the data to the backup storage array R2 on the remote data replication facility. The primary storage array R1 acknowledges the write operation to the host 102 before the primary storage array R1 has received an acknowledgement that the data has been received by the backup storage array R2. The use of asynchronous data replication enables the data on the primary storage array R1 and backup storage array R2 to be one or more cycles out of synchronization, because the primary storage array R1 will continue to execute IOs prior to receipt of acknowledgments from the backup storage array R2. The use of asynchronous replication may be beneficial in connection with sites located geographically distant from each other, for example where the distance between the primary storage array R1 and the backup storage array R2 is such that waiting for an acknowledgement from the backup storage array R2 would take considerable time and, hence, reduce responsiveness of the primary storage array R1 to the host 102.

In some embodiments, as described in greater detail herein, selective packing of small block write operations prior to compression is used to improve compression efficiency, to reduce the amount of bandwidth required to implement remote data replication between the primary storage array R1 and the backup storage array R2. Selective packing may be used in connection with both synchronous RDR data replication mode and asynchronous RDR data replication mode, depending on the implementation.

In some embodiments, packing small block write operations prior to compression might incur some additional overhead, which may require a finite amount of processing time to implement. In asynchronous RDR data replication mode, any additional processing time would not be reflected in the primary storage array's ability to promptly respond to the host 102, since the primary storage array R1 does not need to wait for an acknowledgement from the backup storage array R2. In synchronous RDR data replication mode, the additional finite amount of processing time might delay initiation of transmission of the write operation to the backup storage array R2, which might cause the primary storage array R1 to need to delay acknowledging the write IO to the host. However, in an environment where prepackaging the write IO prior to compression is able to significantly reduce the amount of bandwidth required to transmit the write IO from the primary storage array R1 to the backup storage array R2, the implementation of prepackaging described herein might ultimately increase the responsiveness of the primary storage array R1 to the host 102, by causing the backup storage array R2 to acknowledge the write IOs more quickly due to the decreased transmission latency associated with the decreased bandwidth requirements.

In some embodiments, compression characteristics of write IO operations are forecast, and write IO operations with similar forecast compression characteristics are pooled. Write IO operations are also grouped according to extent, device, and storage group. To create an IO package, write IOs from a given compression pool are preferentially selected first from the extent-level grouping, next from the device-level grouping, and then from the SG-level grouping. In some embodiments, the size of the IO package is based on a size of a slot of shared global memory. The IO package is then compressed, and transmitted on a remote data replication facility. By creating an IO package prior to compression, it is possible to achieve greater compression than would be possible if each individual write IO operation were to be individually compressed. This reduces the network bandwidth required to implement the remote data replication facility.

In some embodiments, as discussed in greater detail below, filesystems (devices) are grouped into storage groups, and the set of storage groups is placed in a RDR group 200. The storage system 100 uses the RDR engine 155 to mirror the data contained in the RDR group from the primary storage array R1 to a backup storage array R2.

In some embodiments, to reduce the amount of bandwidth required to implement the RDR facility, a compression engine 165 is used to compress the data prior to transmitting data from the primary storage array R1 to the backup storage array R2.

In some embodiments, the compression engine 155 is implemented as a compression hardware accelerator, that is configured to support one or more inline compression algorithms. As used herein, the term "data reduction ratio", also abbreviated DRR, is used to refer to the ratio of the size of a piece of data before compression relative to the size of the same piece of data after compression: DRR=original data size/compressed data size. For example, if a 100 kb piece of data is compressed to 50 kb, the DRR for the compression operation is DRR=2 (100/50=2). As another example, if the same 100 kb piece of data is compressed to 25 kb, the DRR for the compression operation is DRR=4 (100/25=4). Accordingly, a higher DRR correlates to enhanced compression, whereas a lower DRR correlates to less efficient compression. A higher DRR results in the need to transmit a smaller piece of data, and hence, a higher DRR requires less bandwidth on the RDR facility.

Individually compressing small blocks of data can result in a lower overall compression ratio, due to higher entropy. The lower overall compression ratio can result in consumption of more network bandwidth on the RDR facility. For example, in instances where write IO operations are received that are relatively small block IO write operations, individual compression of the write IOs prior to transmission on the RDR facility can result in relatively poor overall compression. Additionally, since each IO write operation is required to be individually sent to the compression engine 165, individually compressing the write IO operations can result in excessive use of both the compression hardware and CPU processing resources of the storage engine.

Figure 3:
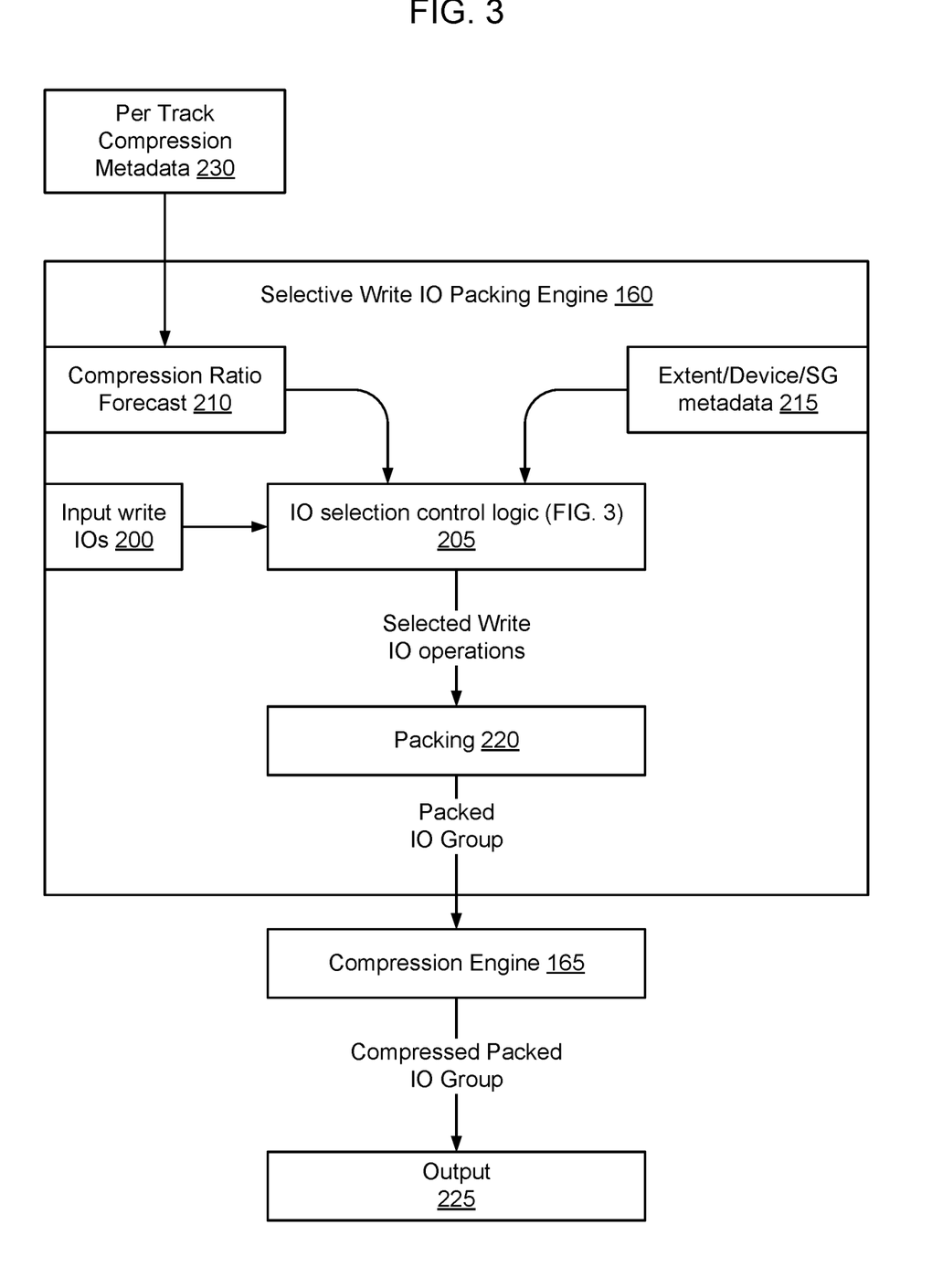
FIG. 3 is a block diagram of an example selective write IO packing engine configured to implement selective packing of small block write operations prior to compression for transmission on the RDR facility, according to some embodiments.

FIG. 3 is a block diagram of an example selective write IO packing engine 160 configured to implement selective packing of small block write operations prior to compression for transmission on the RDR facility, according to some embodiments. As shown in FIG. 3, in some embodiments the selective write IO packing engine 160 is configured to achieve a higher compression ratio, by selecting a set of write IO operations with similar forecast compression characteristics to be packed together, prior to compression, and then compressed as a group using the compression hardware of the compression engine 165 prior to transmission on the RDR facility.

When a write IO is received at input 200, a compression ratio forecast subsystem 210 creates a compression ratio forecast for the write IO. In some embodiments, the compression ratio forecast subsystem accesses per-track compression metadata 230 to determine compression ratios of adjacent tracks, and uses the compression ratios of the adjacent tracks to create a compression ratio forecast for the current write IO. For example, in some embodiments each time the compression engine 165 compresses a track of data, the compression ratio achieved by the compression engine 165 is recorded in per-track compression metadata 230. In some embodiments, when a write IO operation on a given track is received, the compression ratio forecast subsystem 210 accesses the compression ratio for the previous n tracks and the subsequent m tracks from the compression metadata 230, and uses the compression ratio information of the adjacent tracks to create a forecast compression ratio for the given track. In some embodiments, n=m=1 such that the compression ratio forecast subsystem 210 creates a forecast compression ratio for the given track based on an average of the compression ratios of the preceding and subsequent tracks (two adjacent tracks), although other numbers of adjacent tracks may be used depending on the implementation.

The selective write IO packing engine 160 also maintains or accesses extent/device/storage group metadata 215 containing information correlating tracks to extents, devices, and storage groups. The information correlating tracks to extents, devices, and storage groups 215, in some embodiments, is used to group write IO operations into extent-level groupings, device-level groupings, and SG-level groupings. As used herein, an "extent group" is a set of write IO operations on tracks of the same extent; a "device group" is a set of write IO operations on tracks of the same logical device; and a "Storage Group (SG) group" is a set of write IO operations on tracks logical devices that are all included in the same storage group.

Write IO operations with similar compression forecasts are added to compression pools. IO packages are then created from the compression pools, by selecting write IO operations contained in a given compression pool that are included in the same extent group. If insufficient write IO operations contained in the given compression pool are identified that are included in the same extent group, write IO operations contained in the given compression pool that are included in the same device group are selected. If insufficient write IO operations contained in the given compression pool are identified that are included in the same device group, write IO operations contained in the given compression pool that are included in the same storage group (SG) group are selected. In this manner, write IO operations with similar forecast compression characteristics are preferentially selected that are directed to tracks of the same extent, then to tracks of extents of the same device, and finally to tracks of extents of devices that all belong to the same storage group, when creating an IO package. Once the IO package is full, the IO package is compressed by compression engine 165, thus causing all write IO operations packed into the IO package to be compressed as a group. The compressed IO package is then transmitted on output 225.

Since larger blocks of data tend to have reduced entropy, and hence exhibit better compression characteristics, creating IO packages prior to compression tends to exhibit a higher data reduction ratio than compressing write IO operations individually. This reduces the bandwidth required to implement the remote data replication facility between the primary R1 and backup R2 storage arrays. Additionally, by compressing the set of write IO operations as a combined IO package, the IO package only has to be sent to the compression engine once, thus reducing compression overhead and reducing CPU resources required to implement the compression.

Figure 4:
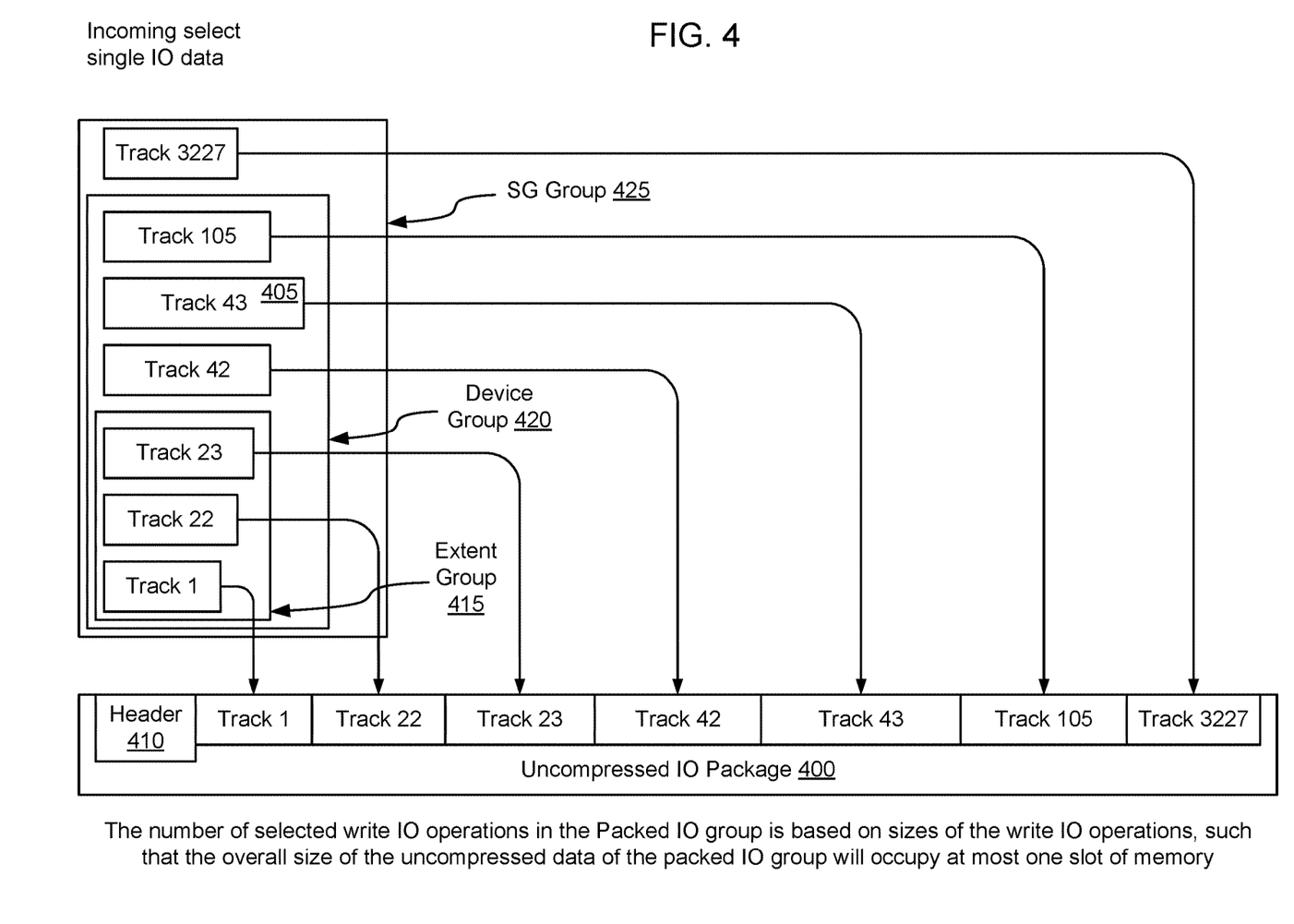
FIG. 4 is a block diagram graphically illustrating creation of an example write IO package from a selected set of small block write operations, according to some embodiments.

FIG. 4 is a block diagram graphically illustrating creation of an example IO package 400 from a selected set of small block write operations 405, according to some embodiments. As shown in FIG. 4, in some embodiments an IO package 400 is created by packing a set of incoming select IO data (write IO operations 405) into an IO package 400. The IO package 400 may include a header 410 identifying the content of the IO package, such as the location and size of each of the write IO operations 405 contained within the IO package 400. In the example shown in FIG. 4, the example IO package 400 is shown as including IO write operations on tracks 1, 22, and 23, which are all write IO operations on tracks on the same extent and, hence, were included in the same extent group 415. The example IO package 400 is shown as also including IO write operations on tracks 42, 43, and 105, which are all write IO operations on tracks of different extents of the same device and, hence, were included in the same device group 420. The example IO package is shown as also including IO write operations on track 3227, which is a write IO operation on a track on another device in the same storage group, and, hence, was included in the same SG group 425.

In some embodiments, the size of the uncompressed IO package is based on the size of a slot of memory, such as a slot of shared global memory 138. For example, in embodiments where slots of memory have a size of 128 Kb, the uncompressed size of the IO package is limited to a maximum of 128 Kb. When an IO package is to be created from a compression pool, a first write IO is selected from a selected compression pool and the extent group containing the selected write IO is identified. A determination is then made if there are any other write IOs in the given compression pool that are also contained in the same extent group 415. If so, those write IOs are added to the IO package. If the IO package has not reached its maximum size and there are no additional write IOs in the given compression pool that are also in the same extent group, the device group containing the selected write IO is identified. Write IOs are then selected from the given compression pool that are also contained in the same device group 420. If the IO package has not reached its maximum size and there are no additional write IOs in the given compression pool that are also in the same device group, the SG group containing the selected write IO is identified, and write IOs are selected from the SG group 425. Write IOs are selected from the given compression pool until the maximum size of an IO package has been reached, such that the uncompressed IO package fits within a slot of memory of storage system 100, or until there are no write IOs in the given compression pool that are contained in the same SG-group.

Figure 5:
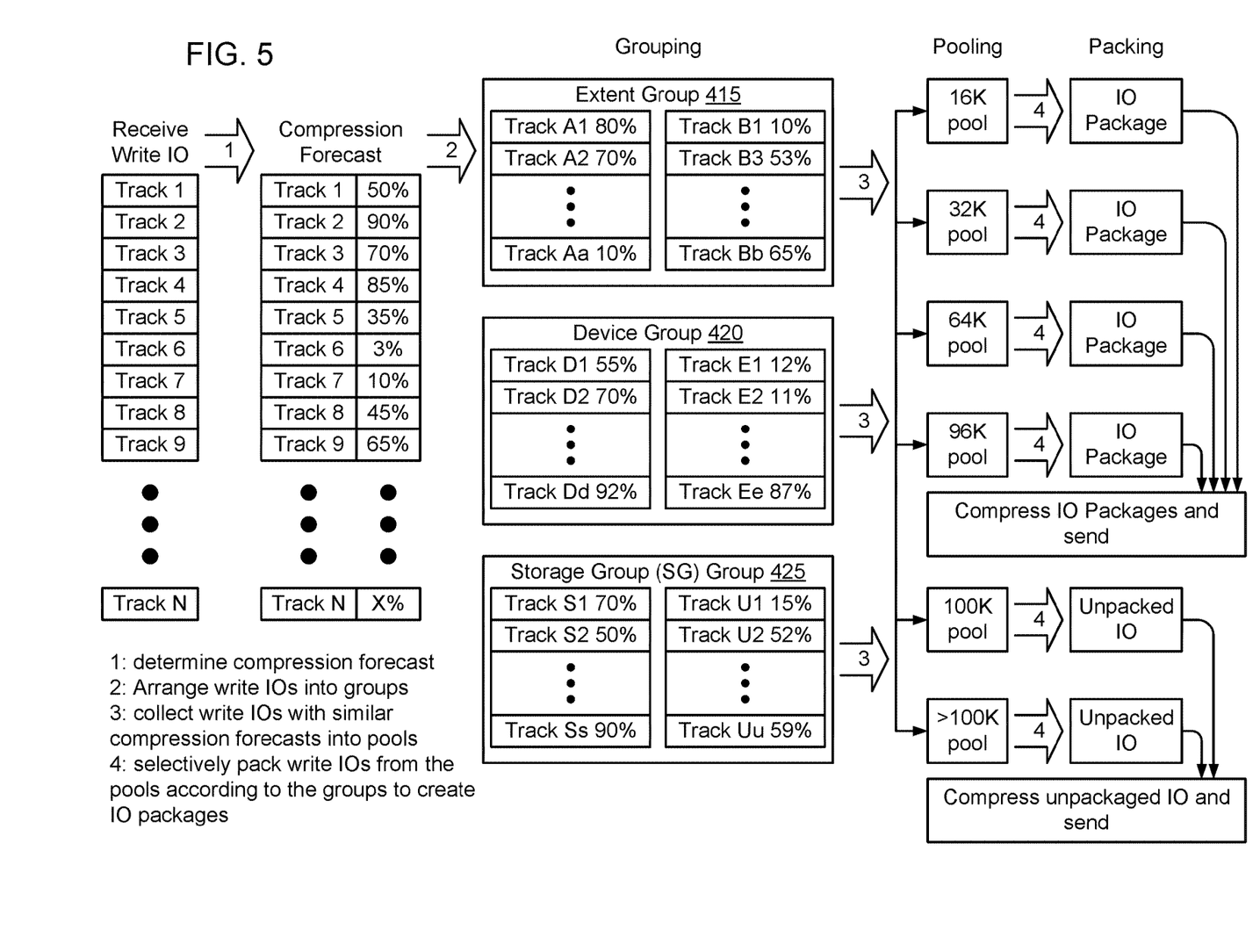
FIG. 5 is a block diagram graphically illustrating a process of selective packing of small block write operations prior to compression, according to some embodiments.

FIG. 5 is a block diagram graphically illustrating a process of selective packing of small block write operations prior to compression, according to some embodiments. As shown in FIG. 5, in some embodiments, writes are received on various tracks over time. Each time a write IO is received, a compression forecast is generated for the write IO to estimate how well the data contained in the write IO is likely to compress, which enables the write IOs to be allocated to compression pools. In the example shown in FIG. 5, there are six compression pools: 16K, 32K, 64K, 96K, 100K, and greater than 100K. The compression pools, in this context, refer to the forecast size of data after compressing a piece of data that has a fixed incoming size, such as 128 Kb. Accordingly, if compression of a write IO was forecast to reduce a piece of data from 128 Kb to between 0 Kb and 16 Kb, the write IO will be assigned to the 16 Kb pool. Compressing 128 Kb to 16 Kb results in an 8:1 data reduction ratio. Of course, many write IO operations are much smaller than 128K. According to some embodiments, any write IO operation with a data reduction ratio of 8:1 or higher is included in the 16K pool. Any write operation with a data reduction ratio smaller than 8:1 but higher than 4:1 is included in the 32K pool. Any write operation with a data reduction ratio smaller than 4:1 but higher than 2:1 is included in the 64K pool, and any write operation with a data reduction ratio smaller than 2:1 but higher than 1.5:1 is included in the 96K pool.

Some data exhibits poor compression characteristics. For example, in FIG. 5 there are two compression pools shown as 100K and >100K. These compression pools are used to contain write IO operations where the forecast compression ratio is lower than 1.5. Due to the overall low compressibility of the data contained by these write operations, roughly equivalent data reduction would be expected to be achieved if the write IOs were individually compressed or if the write IOs were packaged prior to being compressed. Accordingly, to avoid incurring the overhead associated with packaging, in some embodiments the write IOs in the 100K and >100K pools are not packaged and are sent individually (unpackaged) to be compressed for transmission.

Figure 6:
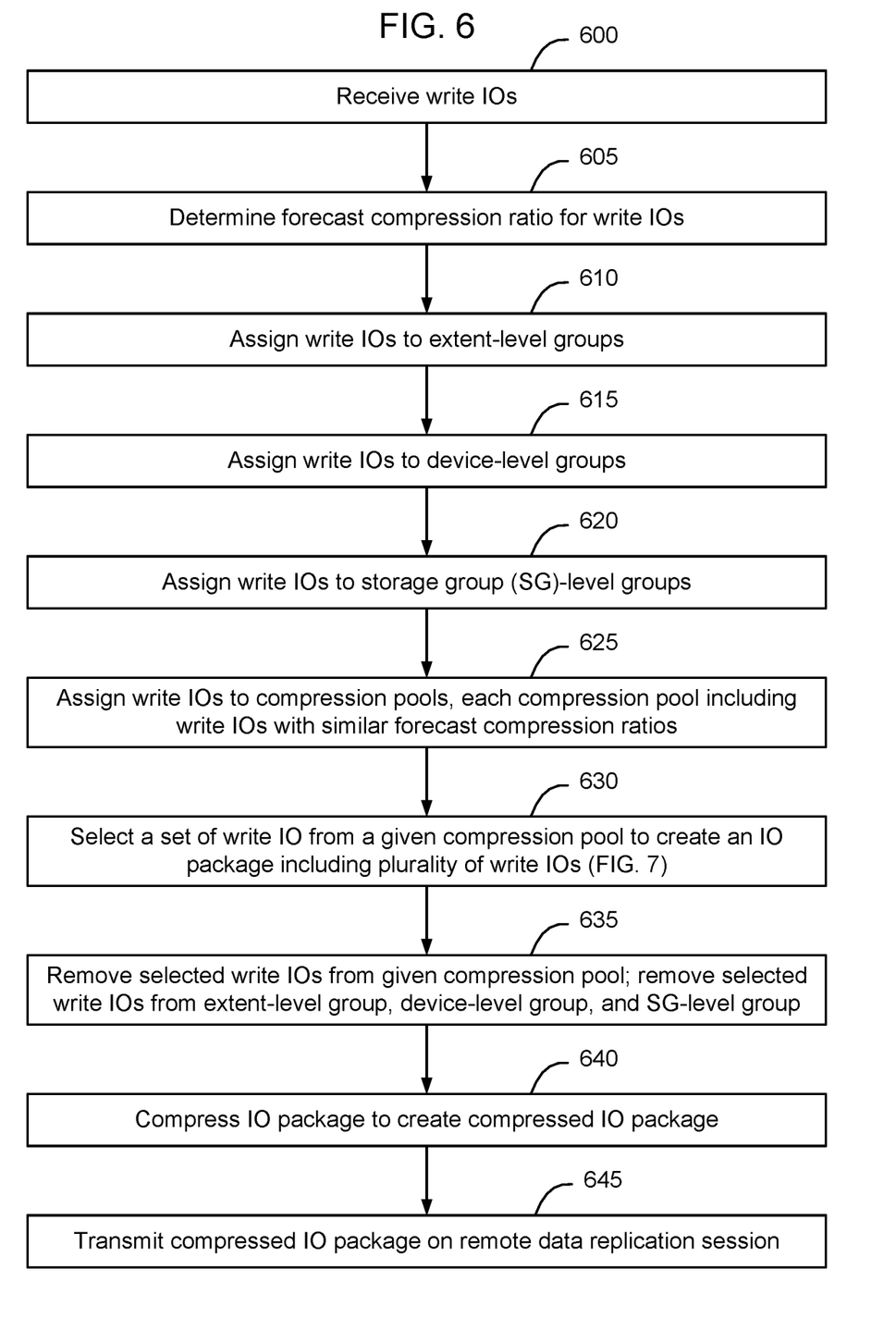
FIGS. 6 and 7 are a flow chart of an example method of selective packing of small block write operations prior to compression, according to some embodiments.
Figure 7:
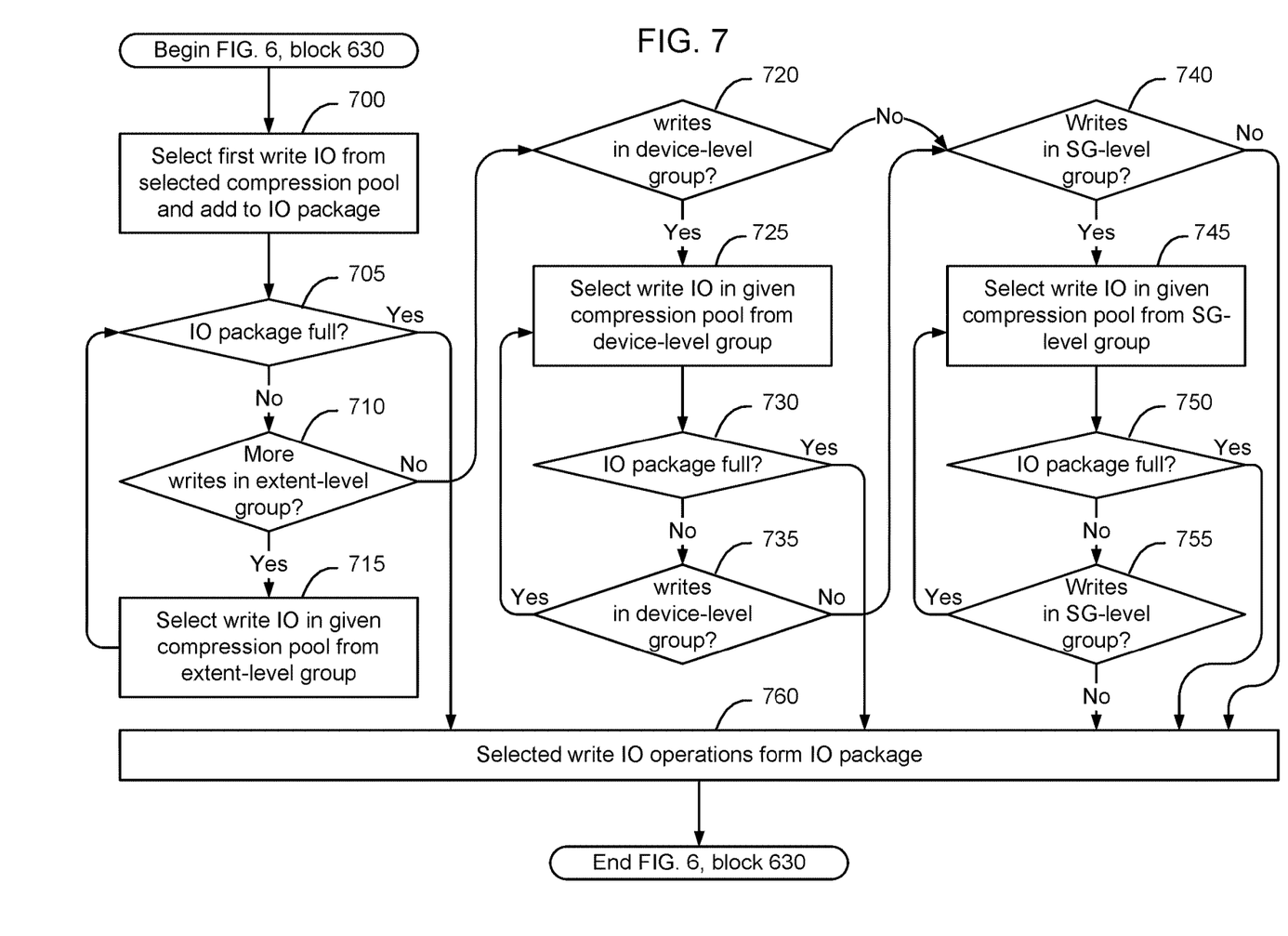

FIGS. 6 and 7 are a flow chart of an example method of selective packing of small block write operations prior to compression, according to some embodiments. In particular, FIG. 6 shows an overview of the process and FIG. 7 provides additional details related to some implementations of block 630 of FIG. 6.

As shown in FIG. 6, when write IO operations are received (block 600), forecast compression ratios are determined for each of the write IO operations (block 605). In some embodiments the forecast compression ratio for a given write IO operation on a given track is determined by the historic compressibility of adjacent tracks as reflected in per-track compressibility metadata 230 stored by the storage system.

The write IO operations are arranged into extent-level groups 415 (block 610), device-level groups 420 (block 615), and storage group (SG)-level groups 425 (block 620). It should be noted that, as used herein, a storage group includes one or more logical devices, each logical device includes one or more extents, and each extent includes a large number of tracks. For example, a storage group might include 5-100 devices, each device might include thousands of extents, and each extent might include on the order of a hundred or more tracks. When a write IO is received on an individual track, the individual track will be contained in a particular extent. The write IO will, accordingly, be added to the extent-level group 415 for that particular extent. The particular extent belongs to a particular device. The write IO will, accordingly, also be added to the device-level group 420 for the device that contains the particular extent. Similarly, the device belongs to a particular storage group and, accordingly, the write IO will also be added to the respective SG-level group 425. Thus, in some embodiments, a given write IO will be contained in at least three groups—a per-extent group 415, a per-device group 420, and a per-SG group 425.

Write IOs are also assigned to a set of two or more compression pools, based on their respective determined forecast compression ratios (block 625). Specifically, in some embodiments, write IOs with similar forecast compression ratios are commonly assigned to a respective compression pool. Although FIG. 5 shows some embodiments in which there are four compression pools that are used for selective packing of write IO operations and two compression pools that are used to contain write IO operations that are not selectively packed prior to compression, the particular number of compression pools in the set of two or more compression pools will depend on the particular implementation. In some embodiments, by sorting the write IOs into compression pools according to the forecast compression characteristics, it is possible to select write IO operations for inclusion in an IO package that are all expected to compress to approximately the same compression ratio, to thereby achieve good compression characteristics when the IO package is compressed by the compression engine 165.

A determination is then made to select a set of write IOs from a given compression pool to create an IO package including a plurality of write IOs (block 630). The particular criteria as to when to elect to create an IO package from a given compression pool will depend on the particular implementation. Example criteria may be to continuously create IO packages from each compression pool, to create IO packages from the compression pools by selecting compression pools in a round robin or weighted round robin manner, by selecting compression pools based on the number of write IO operations in the respective compression pools, or using multiple other methodologies.

When a compression pool is selected, write IOs contained in the selected compression pool are chosen for inclusion in the write IO package by preferentially selecting write IOs from the selected compression pool that are all contained in the same extent-level group, then selecting write IOs from the selected compression pool that are all contained in the same device-level group, and then selecting write IOs from the selected compression pool that are all contained in the same SG-level group. Additional details about some embodiments of selecting write IOs for inclusion in a write IO package are described in connection with FIG. 7.

Once a set of write IOs have been selected to be included in the IO package, the selected write IOs are removed from the selected compression pool, and are also removed from the extent-level group, device-level group, and storage group (SG)-level group (block 635). The IO package containing the selected group of two or more write IOs is then compressed to create a compressed IO package (block 640). The compressed IO package is then transmitted on the remote data replication facility from the primary storage array R1 to the backup storage array R2 (block 645).

FIG. 7 provides additional details regarding some embodiments of selecting a group of write IOs to be included in an IO package of block 630 of FIG. 6. Specifically, as shown in FIG. 7, in some embodiments write IOs are preferentially selected from a given compression pool to create an IO package. Accordingly, as shown in FIG. 7, in some embodiments a first write IO is selected from a given compression pool and added to an IO package (block 700). The first write IO will belong to a given extent-level group, given device-level group, and SG-level group. Specifically, the write IO is directed to a particular track, which is included in a particular extent. All write IOs on the particular extent form an extent-level group for the first selected write IO. Likewise, the extent is included in a particular logical device and, accordingly, all write IOs on the particular logical device form a device-level group for the first selected write IO. Additionally, the device is included in a particular storage group (SG) and, accordingly, all write IOs on the set of logical devices that are included in the SG form a SG-level group for the first selected write IO.

Once an initial write IO operation is selected (block 700), a determination is then made if the IO package is full (block 705). In some embodiments, an IO package has a maximum size based on a size of a slot of memory on storage system 100, although the particular maximum size of the IO package will depend on the particular implementation. In response to a determination that the IO package is full (a determination of YES at block 705), the set of IO operations previously selected to be included in the IO package are used to form the IO package (block 760).

In response to a determination that the IO package is not full (a determination of NO at block 705), a determination is made as to whether there are additional write IO operations in the extent-level group 415 for the initial selected write IO (block 710). If there are additional writes in the extent-level group 415 for the initial selected write IO (a determination of YES at block 710), another write IO in the given compression pool from the extent-level group 415 for the initial selected write IO is selected and added to the IO package (block 715). The process then returns to block 705, and the process of selecting write IOs from the given extent-level group 415 is iterated until the IO package is full (a determination of YES at block 705) or until there are no more additional writes in the extent-level group 415 for the initial selected write IO (a determination of NO at block 710).

If the IO package is not full (a determination of NO at block 705) and there are no more additional writes in the extent-level group 415 for the initial selected write IO (a determination of NO at block 710), a determination is made if there are any write IO operations in the device-level group 420 for the initial selected write IO (block 720). If there are write IO operations in the given compression pool from the device-level group 420 for the initial selected write IO (a determination of YES at block 720), a write IO operation in the given compression pool is selected from the device-level group 420 for the initial selected write IO (block 725).

A determination is then made if the IO package is full (block 730). In response to a determination that the IO package is full (a determination of YES at block 730), the set of IO operations previously selected to be included in the IO package are used to form the IO package (block 760).

In response to a determination that the IO package is not full (a determination of NO at block 730), a determination is made as to whether there are additional write IO operations in the device-level group 420 for the initial selected write IO (block 735). If there are additional writes in the device-level group 420 for the initial selected write IO (a determination of YES at block 735), another write IO in the given compression pool from the device-level group 420 for the initial selected write IO is selected and added to the IO package (block 725). The process of selecting write IOs from the given device-level group 420 (blocks 725, 730, and 735) is iterated until the IO package is full (a determination of YES at block 730) or until there are no more additional writes in the device-level group 420 for the initial selected write IO (a determination of NO at block 735).

In response to a determination that there were no writes in the device-level group 420 for the initial selected write IO (a determination of NO at block 720), or in response to a determination that the IO package is not full (a determination of NO at block 730) and that there are no more additional writes in the device-level group 420 for the initial selected write IO (a determination of NO at block 735), a determination is made if there are any write IO operations in the SG-level group 425 for the initial selected write IO (block 740).

In response to a determination that there are no writes in the SG-level group 425 for the initial selected write IO (a determination of NO at block 740), the set of IO operations previously selected to be included in the IO package are used to form the IO package (block 760).

If there are write IO operations in the given compression pool from the SG-level group 425 for the initial selected write IO (a determination of YES at block 740), a write IO operation in the given compression pool is selected from the SG-level group 425 for the initial selected write IO (block 745).

A determination is then made if the IO package is full (block 750). In response to a determination that the IO package is full (a determination of YES at block 750), the set of IO operations previously selected to be included in the IO package are used to form the IO package (block 760).

In response to a determination that the IO package is not full (a determination of NO at block 750), a determination is made as to whether there are additional write IO operations in the SG-level group 425 for the initial selected write IO (block 755). If there are additional writes in the SG-level group 425 for the initial selected write IO (a determination of YES at block 755), another write IO in the given compression pool from the SG-level group 425 for the initial selected write IO is selected and added to the IO package (block 725). The process of selecting write IOs from the given SG-level group 425 (blocks 745, 750, and 755) is iterated until the IO package is full (a determination of YES at block 750) or until there are no more additional writes in the SG-level group 425 for the initial selected write IO (a determination of NO at block 755). In either instance (a determination of YES at block 750 OR a determination of NO at block 755), the set of IO operations previously selected to be included in the IO package are used to form the IO package (block 760).

Once the set of IO operations has been selected (block 760), the process returns to FIG. 6, where the IO package including the selected set of IO operations is compressed to create the compressed IO package (block 640), and the compressed IO package is transmitted on the remote data replication session (block 645).

Figure 8:
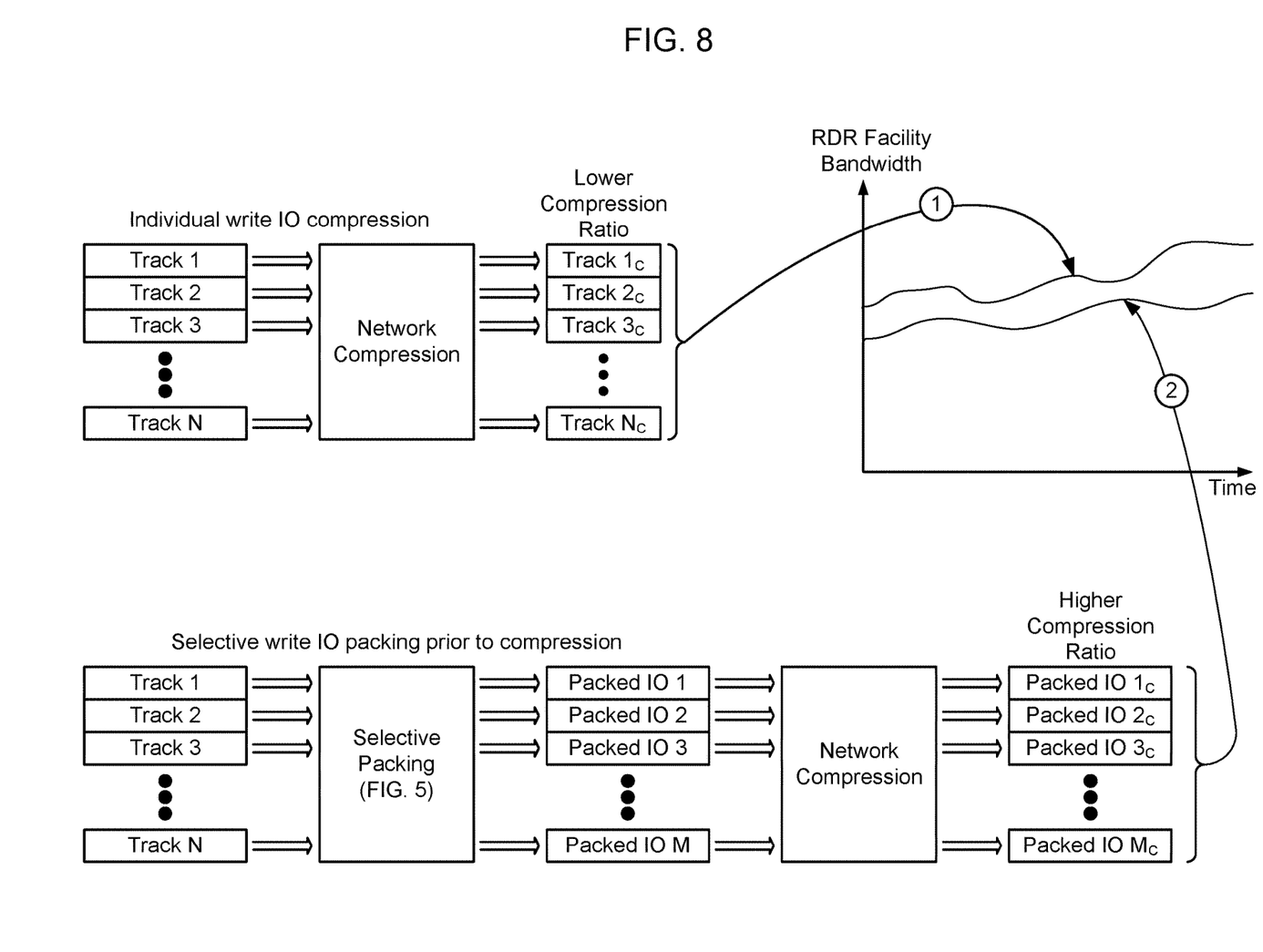
FIG. 8 is graph illustrating a hypothetical comparison between an amount of bandwidth required to implement a Remote Data Replication (RDR) facility when write IO operations on the primary storage array are individually compressed prior to being transmitted on the RDR facility, and an amount of bandwidth required to implement the RDR facility when write IO operations are selectively grouped prior to being compressed and transmitted on the RDR facility, according to some embodiments.

FIG. 8 is graph illustrating a hypothetical comparison between an amount of bandwidth required to implement a Remote Data Replication (RDR) facility when write IO operations on the primary storage array are individually compressed prior to being transmitted on the RDR facility, and an amount of bandwidth required to implement the RDR facility when write IO operations are selectively grouped prior to being compressed and transmitted on the RDR facility, according to some embodiments.

Specifically, in FIG. 8 the top method shows individual write IO compression, whereas the bottom method shows selective write IO packing prior to compression. As shown in the top method of FIG. 8, in some embodiments when small write IO operations are received and individually compressed, the overall compression exhibited by the compression engine can result in a lower compression ratio. When compression of this nature is implemented in connection with transmission of write IO operations between storage arrays implementing a RDR facility, this can result in increased consumption of bandwidth on the RDR facility (arrow 1). By comparison, as shown on the bottom method of FIG. 8, when small write IO operations are received and selectively packed into IO packages prior to compression, the overall compression exhibited by the compression engine can result in a higher compression ratio than would be achieved by the top method. Thus, when the write IO operations are selectively packed into IO packages, and then the IO packages are compressed prior to transmission of the write IO operations between storage arrays implementing a RDR facility, this can result in decreased consumption of bandwidth on the RDR facility (arrow 2). Decreased bandwidth usage can result in less latency, thus increasing the overall performance of the RDR facility.

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of selective packing of small block write operations prior to compression, comprising:
creating a plurality of Storage Groups (SG), each SG including at least one logical storage device, the logical storage device including a plurality of extents, and each extent including a plurality of tracks;
receiving write operations, each write operation being directed at a respective track on a respective extent in a respective device in a respective SG;
forecasting compressibility characteristics of each received write operation;
pooling write operations with similar forecast compressibility characteristics into a set of two or more compressibility pools;
forming a set of extent-level groups, each extent-level group including write operations on tracks included in the respective extent;
forming a set of device-level groups, each device-level group including write operations on tracks included in extents included in the respective device;
forming a set of SG-level groups, each SG-level group including write operations on tracks included in extents included in devices included in the respective SG;
creating Input/Output (IO) packages from each of the compressibility pools, each IO package containing a respective selected set of write IO operations contained in at most one of the compressibility pools, the respective selected set of write IO operations being selected first from the extent-level group, then from the device-level group, and then from the SG-level group.

2. The method of claim 1, further comprising:
compressing each IO package to create a respective compressed IO package; and
transmitting each IO package on a remote data replication facility from a primary storage system to a backup storage system.

3. The method of claim 2, further comprising removing respective selected sets of write IO operations from the compressibility pools, extent-level groups, device-level groups, and from the SG-level groups after the respective selected sets of write IO operations have been added to the respective IO packages.

4. The method of claim 1, wherein forecasting compressibility characteristics of each received write operation comprises determining a track of the received write operation, accessing compressibility metadata for adjoining tracks, and using the compressibility metadata for the adjoining tracks to generate the forecast compressibility of the received write operation.

5. The method of claim 4, wherein the compressibility metadata for adjoining tracks contains compressibility values of the adjoining tracks achieved by previous compression operations on data contained in the adjoining tracks.

6. The method of claim 5, wherein using the compressibility metadata for the adjoining tracks to generate the forecast compressibility of the received write operation comprises averaging the compressibility values of the adjoining tracks.

7. The method of claim 4, wherein each of the two or more compressibility pools has a respective data reduction ratio threshold, wherein forecasting compressibility characteristics of each received write operation comprises determining a forecast data reduction ratio for the write operation that is expected to be achieved when data of the write operation is compressed, and wherein each write IO operation is assigned to at most one of the compressibility pools, each write IO operation being assigned to a compressibility pool with a highest respective data reduction ratio threshold that lower than the respective forecast data reduction ratio of the write IO operation.

8. The method of claim 1, wherein the write operations are directed to tracks of data included in a remote data replication group associated with a remote data replication facility.

9. The method of claim 1, wherein each IO package contains a respective selected set of two or more independent and unrelated write IO operations.

10. The method of claim 9, wherein each IO package has an uncompressed maximum size based on a size of a slot of memory on the storage system.

11. A system for selective packing of small block write operations prior to compression, comprising:
one or more processors and one or more storage devices storing instructions that are operable, when executed by the one or more processors, to cause the one or more processors to perform operations comprising:
creating a plurality of Storage Groups (SG), each SG including at least one logical storage device, the logical storage device including a plurality of extents, and each extent including a plurality of tracks;
receiving write operations, each write operation being directed at a respective track on a respective extent in a respective device in a respective SG;
forecasting compressibility characteristics of each received write operation;
pooling write operations with similar forecast compressibility characteristics into a set of two or more compressibility pools;
forming a set of extent-level groups, each extent-level group including write operations on tracks included in the respective extent;
forming a set of device-level groups, each device-level group including write operations on tracks included in extents included in the respective device;
forming a set of SG-level groups, each SG-level group including write operations on tracks included in extents included in devices included in the respective SG;
creating Input/Output (IO) packages from each of the compressibility pools, each IO package containing a respective selected set of write IO operations contained in at most one of the compressibility pools, the respective selected set of write IO operations being selected first from the extent-level group, then from the device-level group, and then from the SG-level group.

12. The system of claim 11, the operations further comprising:
compressing each IO package to create a respective compressed IO package; and
transmitting each IO package on a remote data replication facility from a primary storage system to a backup storage system.

13. The system of claim 12, the operations further comprising removing respective selected sets of write IO operations from the compressibility pools, extent-level groups, device-level groups, and from the SG-level groups after the respective selected sets of write IO operations have been added to the respective IO packages.

14. The system of claim 11, wherein forecasting compressibility characteristics of each received write operation comprises determining a track of the received write operation, accessing compressibility metadata for adjoining tracks, and using the compressibility metadata for the adjoining tracks to generate the forecast compressibility of the received write operation.

15. The system of claim 14, wherein the compressibility metadata for adjoining tracks contains compressibility values of the adjoining tracks achieved by previous compression operations on data contained in the adjoining tracks.

16. The system of claim 15, wherein using the compressibility metadata for the adjoining tracks to generate the forecast compressibility of the received write operation comprises averaging the compressibility values of the adjoining tracks.

17. The system of claim 14, wherein each of the two or more compressibility pools has a respective data reduction ratio threshold, wherein forecasting compressibility characteristics of each received write operation comprises determining a forecast data reduction ratio for the write operation that is expected to be achieved when data of the write operation is compressed, and wherein each write IO operation is assigned to at most one of the compressibility pools, each write IO operation being assigned to a compressibility pool with a highest respective data reduction ratio threshold that lower than the respective forecast data reduction ratio of the write IO operation.

18. The system of claim 11, wherein the write operations are directed to tracks of data included in a remote data replication group associated with a remote data replication facility.

19. The system of claim 11, wherein each IO package contains a respective selected set of two or more independent and unrelated write IO operations.

20. The system of claim 19, wherein each IO package has an uncompressed maximum size based on a size of a slot of memory on the storage system.

* * * * *